(12) United States Patent
Schaal

(10) Patent No.: US 7,025,316 B2
(45) Date of Patent: Apr. 11, 2006

(54) HOLDER FOR A DRINK CONTAINER

(75) Inventor: Falk Schaal, Alpirsbach (DE)

(73) Assignee: fischerwerke Artur Fischer GmbH & Co. KG, Waldachtal (DE)

( * ) Notice: Subject to any disclaimer, the term of this patent is extended or adjusted under 35 U.S.C. 154(b) by 0 days.

(21) Appl. No.: 10/149,780

(22) PCT Filed: Nov. 29, 2000

(86) PCT No.: PCT/EP00/11931

§ 371 (c)(1),
(2), (4) Date: Jun. 13, 2002

(87) PCT Pub. No.: WO01/60657

PCT Pub. Date: Aug. 23, 2001

(65) Prior Publication Data

US 2002/0179660 A1 Dec. 5, 2002

(30) Foreign Application Priority Data

Feb. 18, 2000 (DE) .................................. 100 07 594

(51) Int. Cl.
A47K 1/08 (2006.01)
(52) U.S. Cl. ..................... 248/311.2; 248/312; 224/926
(58) Field of Classification Search ............. 248/311.2, 248/312, 309.1, 315; 224/926, 282
See application file for complete search history.

(56) References Cited

U.S. PATENT DOCUMENTS

| 3,503,648 | A |   | 3/1970  | James ............................ 296/37    |
| 4,568,117 | A |   | 2/1986  | McElfish et al. ........... 296/37.8        |
| 4,902,061 | A |   | 2/1990  | Plavetich et al. ......... 296/37.12        |
| 5,248,183 | A | * | 9/1993  | Gignac et al. .......... 297/188.16         |
| 5,318,343 | A | * | 6/1994  | Spykerman et al. ..... 297/188.16           |
| 5,489,054 | A |   | 2/1996  | Schiff .......................... 224/281   |
| 5,503,297 | A | * | 4/1996  | Frankel ....................... 220/751     |
| 5,505,516 | A | * | 4/1996  | Spykerman et al. ...... 248/311.2           |
| 5,601,268 | A | * | 2/1997  | Dunchock ................. 248/311.2        |
| 5,628,486 | A | * | 5/1997  | Rossman et al. ......... 248/311.2          |
| 5,800,005 | A |   | 9/1998  | Arold et al. .............. 296/37.12       |
| 5,890,692 | A | * | 4/1999  | Lee et al. ................. 248/311.2      |
| 5,899,426 | A | * | 5/1999  | Gross et al. .............. 248/311.2       |
| 5,997,082 | A | * | 12/1999 | Vincent et al. ........... 297/188.19       |
| 6,059,243 | A | * | 5/2000  | Hikage et al. ............ 248/311.2        |
| 6,065,729 | A | * | 5/2000  | Anderson ................. 248/311.2        |
| 6,234,438 | B1| * | 5/2001  | Plocher et al. ............ 248/311.2       |
| 6,431,391 | B1| * | 8/2002  | Kaupp ......................... 220/737     |
| 6,439,525 | B1| * | 8/2002  | Gehring et al. ........... 248/311.2        |

(Continued)

FOREIGN PATENT DOCUMENTS

DE 295 07 949 U 7/1995

(Continued)

Primary Examiner—A. Joseph Wujciak
(74) Attorney, Agent, or Firm—Michael J. Striker

(57) ABSTRACT

The invention relates to a holding device (10) for a drinks container. For space-saving housing of the holding device (10), the invention proposes constructing the holding device (10) as a recess (14), for example, in a dashboard (12) of a motor vehicle, and providing it with an ashtray (20) pivotable into and out of the recess (14). In the holding position pivoted out of the recess (14), the ashtray (20) closes the recess (14) laterally, so that, for example, a beaker (44) can be inserted in the recess (14). The invention has the advantage that the installation space for the ashtray (20) is simultaneously used also for insertion of the beaker (44) (FIG. 5).

5 Claims, 4 Drawing Sheets

U.S. PATENT DOCUMENTS

| | | | |
|---|---|---|---|
| 6,464,187 B1 * | 10/2002 | Bieck et al. | 248/311.2 |
| 6,634,690 B1 * | 10/2003 | Schaal | 296/37.1 |
| 6,708,938 B1 * | 3/2004 | Bong | 248/311.2 |

FOREIGN PATENT DOCUMENTS

| | | | |
|---|---|---|---|
| DE | 195 19 602 C | 9/1996 | |
| DE | 195 43 925 C1 | 2/1997 | |
| DE | 197 24 597 C1 | 11/1998 | |
| DE | 298 08 145 U1 | 6/1999 | |
| EP | 0 778 175 A | 6/1997 | |
| FR | 2 769 270 A | 4/1999 | |
| JP | 61-9596 | 3/1986 | |
| JP | 2-18748 | 5/1990 | 3/10 |
| JP | 6-48237 | 2/1994 | 3/10 |
| JP | 08127277 | 5/1996 | |
| JP | 2547448 | 5/1997 | 3/10 |
| JP | 11042964 | 2/1999 | |
| JP | 11151969 | 6/1999 | |

* cited by examiner

HOLDER FOR A DRINK CONTAINER

BACKGROUND OF THE INVENTION

The invention relates to a holding device for a drinks container, for example a drinks can, a beaker or a cup.

Such holding devices are known per se in an almost incalculable number of constructions. The invention is based on the problem of constructing a holding device for a drinks container so that it can be accommodated in a space-saving manner.

SUMMARY OF THE INVENTION

That problem is solved in accordance with the invention by the features of Claim 1. The holding device according to the invention has a receiving space into which the drinks container can be inserted, the receiving space being in the form of a recess, for example, in a dashboard, a centre console or the door panelling of a motor vehicle, in the back of a seat in a bus, aeroplane, cinema etc. or in arm rests of such seats. The receiving space is open to one side. A receptacle such as an ashtray, a storage box or a spectacle case is movably mounted at the receiving space by means of a guide. The receptacle can be brought into a closed position and into a holding position. In the closed position, the receptacle closes the receiving space for insertion of the drinks container. In the holding position, the receptacle closes the receiving space at the open side and leaves an insertion opening at the top of the receiving space free, so that the drinks container can be placed into the recess forming the receiving space. It is not necessary for an inserted drinks container to be surrounded circumferentially without interruption by the receiving space and the receptacle, it is sufficient for the receiving space and the receptacle to surround the drinks container at individual points of the circumference so that the drinks container cannot fall out.

The invention has the advantage that the holding device can be housed in space-saving manner, for example, in a dashboard, a centre console or a door panelling. In particular, the installation space taken up by, for example, an ashtray that is already present can additionally be used for the holding device according to the invention for the drinks container, so that the holding device according to the invention takes up no additional installation space. A further advantage of the invention is a possible simple construction of the holding device according to the invention with, for example, a single movable part, namely, the receptacle, on which perhaps additionally a lid can be mounted as second movable part. It is an added advantage that these parts are already provided, for example, in the form of an ashtray, so that no additional manufacturing and assembly costs are incurred.

A simple kind of guide for the receptacle is provided in one construction of the invention by forming the guide as a pivoting guide with a pivot bearing for the receptacle.

In a development of the invention, the holding device comprises a locking device with several locking positions for the receptacle. In this connection, one locking position holds the receptacle in the closed position, and the other locking positions hold the receptacle in several holding positions, in which the receptacle is moved to different extents out of the recess forming the receiving space for insertion of the drinks container. In this way, the insertion opening for the drinks container is of different size so that drinks containers of different diameters are held secure against tilting. The locking device according to the invention has the advantage that the diameter of the holding device can be adapted in a simple manner to different drinks containers.

In a construction of the invention, a drip tray for catching liquid that escapes from a drinks container placed in the holding device is provided. The drip tray is preferably mounted on the receptacle.

In a preferred construction of the invention, the receptacle is detachably mounted at the recess forming the receiving space for the drinks container. As a result, firstly the drip tray can be emptied and cleaned, and the receptacle itself can likewise be emptied, which is necessary for example, if the receptacle is an ashtray.

In a construction of the invention, the receptacle forms an ashtray.

The invention is explained in detail hereinafter with reference to two exemplary embodiments illustrated in the drawings, in which:

DESCRIPTION OF THE PREFERRED EMBODIMENTS

Figure 1:
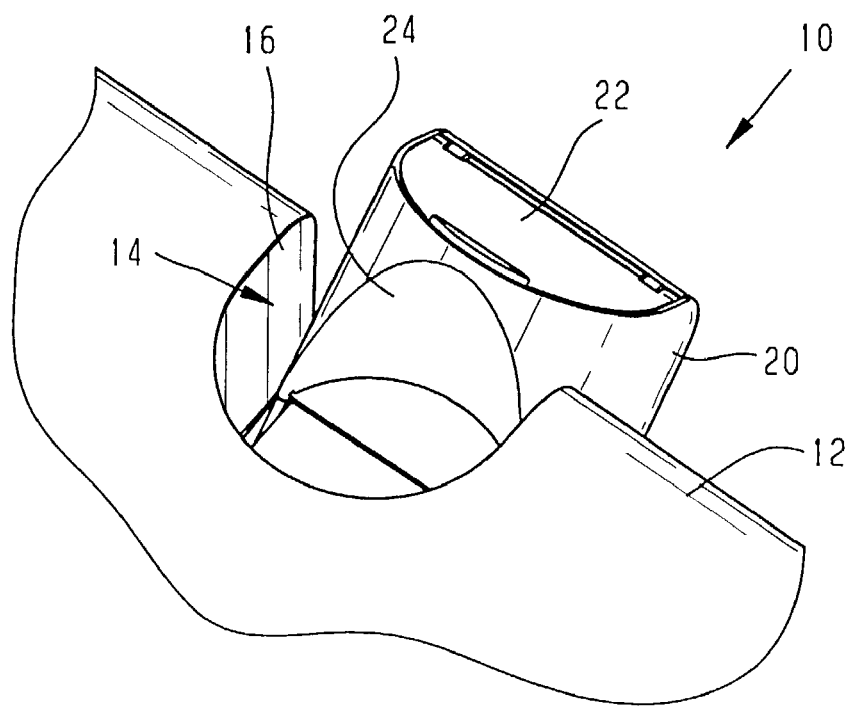
FIGS. 1 to 3 show in a perspective view from different viewing directions a holding device according to the invention in different positions.
Figure 2:
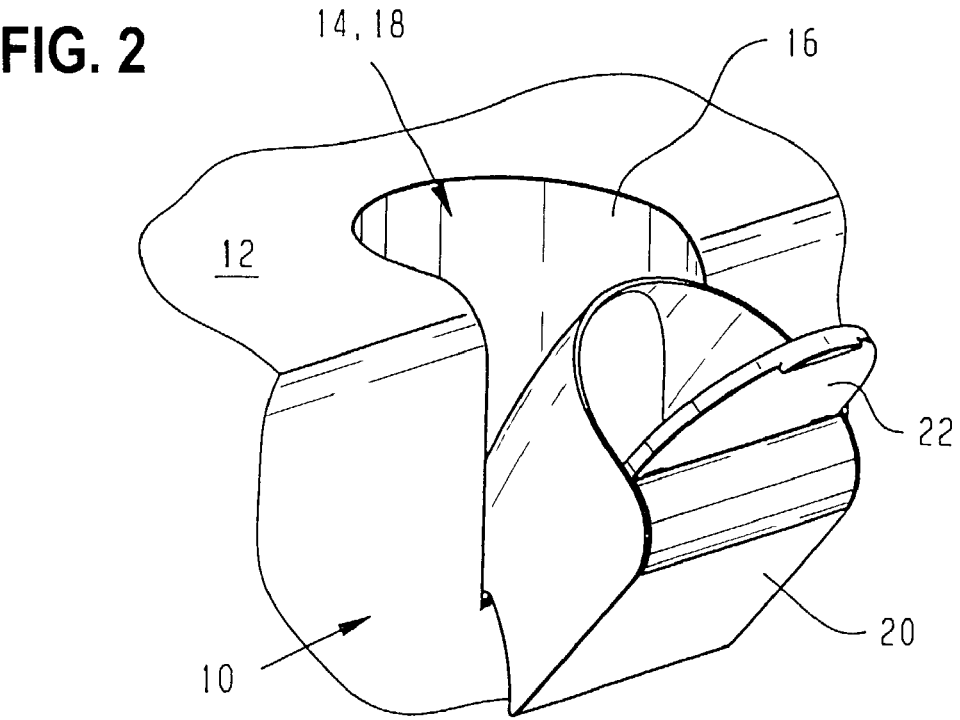
Figure 3:
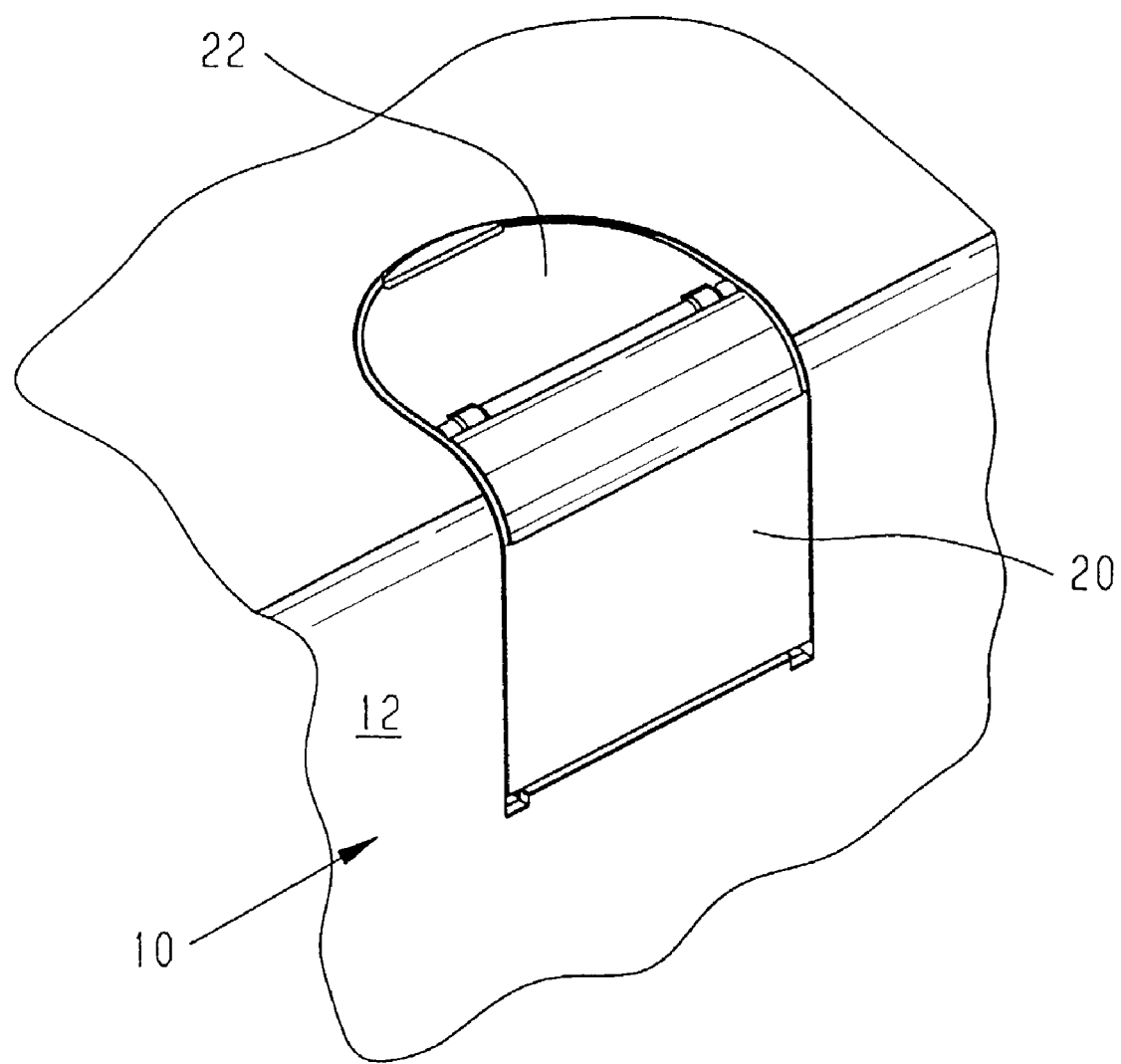

The holding device 10 according to the invention illustrated in FIGS. 1 to 3 for a drinks container, not illustrated in FIGS. 1 to 3, is accommodated, for example, in a dashboard 12 of a motor vehicle, not otherwise illustrated. Of the dashboard 12, a fragment surrounding the holding device 10 is shown in the drawing. The holding device 10 comprises a receiving space 14 for insertion of the drinks container, the receiving space 14 being in the form, in plan view, of a U-shaped recess 14 in the dashboard 12. The recess 14 is open at a top side; the open top side of the recess 14 forms an insertion opening 18 for insertion of the drinks container in the holding device 10. Furthermore, the recess 14 forming the receiving space 14 is open to one side. Instead of being accommodated in a dashboard 12, the holding device according to the invention can alternatively be accommodated, for example, in a centre console, a door panelling or an arm rest.

By means of a guide, a receptacle 20 is movably mounted at the recess 14 forming the receiving space for insertion of the drinks container. In the embodiment illustrated, the receptacle 20 is an ashtray with a hinged lid 22 at its upper side. The ashtray 20 is movable out of a closed position illustrated in FIG. 3 into a holding position illustrated in FIGS. 1 and 2, and vice versa. In the closed position, the ashtray 20 closes the recess 14 at its open side and the insertion opening 18 at the top side of the recess 14. In the closed position, the ashtray 20 closes the recess 14 flush with the adjacent surfaces of the dashboard 12.

In the holding position illustrated in FIGS. 1 and 2, the ashtray 20 has been moved out of the dashboard 12 to the side, and therefore opens up the insertion opening 18 of the recess 14. At the same time, the ashtray 20 closes the open side of the recess 14, so that an inserted drinks container is held in the recess 14 secure against falling out and tilting. For that purpose, the ashtray 20 has a concave wall 24 on its side facing the recess 14. The hinged lid 22 is openable in all positions of the ashtray 20, so that the ashtray 20 can be used in both the closed position and the holding position.

Figure 4:
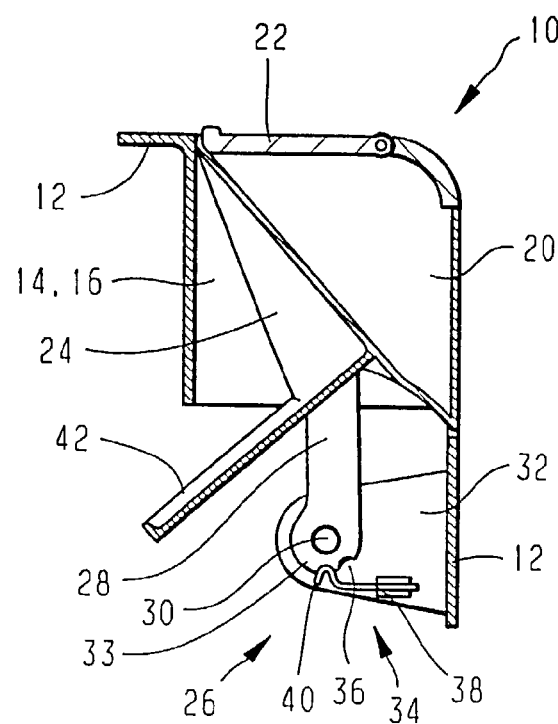
FIG. 4 shows the holding device of FIGS. 1 to 3 in a central cross-section in a closed position.

The guide of the ashtray 20 of the holding device 10 according to the invention is in the form of a pivoting guide having a pivot bearing 26 (FIG. 4). The pivot bearing 26 is arranged beneath the ashtray 20 and the recess 14 in the dashboard 12. The ashtray 20 comprises two downwardly extending, laterally arranged arms 28 that are provided at their lower end with a bearing hole, with which they are pivotally mounted on bearing pins 30. The bearing pins 30 are provided beneath the recess 14 on two lateral tongues 32 of the dashboard 12, the tongues 32 projecting inwards from the inside of the dashboard 12. By virtue of the pivot bearing 26, the ashtray 20 is pivotable about a notional horizontal axis beneath the ashtray 20.

By resiliently compressing the arms 28 of the ashtray 20, the arms 28 can be disengaged from the pivot pins 30 and the ashtray 20 can be released from the holding device 10, in order, for example, to be able to empty it. In the region of the pivot bearing 26 a locking device 34 is constructed, which holds the ashtray 20 in both the closed position and the holding position. To form the locking device 34, an end edge 33 of the holding arms 28 is of semicircular form and concentric with respect to the pivot pins 30. In the circumference of the end edge 33 there are two dished recesses 36 that co-operate with a leaf spring 38 secured to the tongues 32 of the dashboard 12. A free end of the leaf spring 38 is bent to form a hook, a convex side of the "hook" 40 being located resiliently in one of the two recesses 36. In this connection, in the closed position of the ashtray 20 the hook 40 lies in one of the two recesses 36 (FIG. 4) and in the holding position in the other recess 36 (FIG. 5), and consequently holds the ashtray 20 locked in the particular position. By pressure or by pulling on the ashtray 20, the hook 40 of the leaf spring 38 can be pushed out of the recess 36 of the arm 28 of the ashtray 20 and in this way the ashtray 20 can be pivoted.

Figure 5:
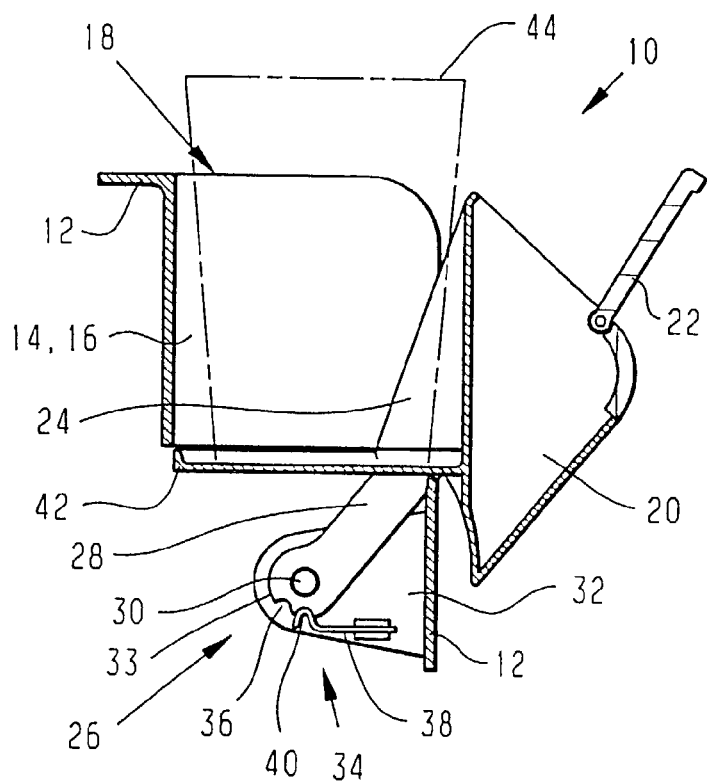
FIG. 5 shows the holding device of FIG. 4 in a holding position.

On its the concave wall 24 facing the recess 14, the ashtray 20 has a drip tray 42, which in the holding position of the ashtray 20 is horizontally aligned and closes the recess 14 at its underside (FIG. 5). The drip tray 42 serves for placement of a drinks container (beaker) 44 indicated in FIG. 5 by dot-dash lines, which is inserted into the recess 14, forming the receiving space, of the holding device 10 according to the invention. The drip tray 42 serves to catch liquid spilled from the beaker 44 during travel.

Figure 6:
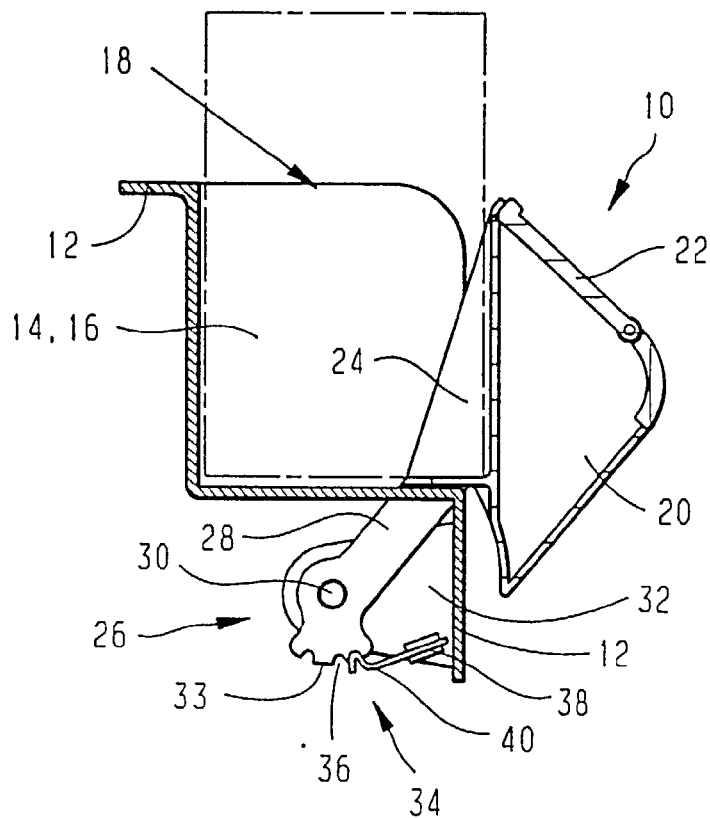
FIGS. 6 and 7 show a modified construction of a holding device according to the invention in a central cross-section in two different holding positions.
Figure 7:
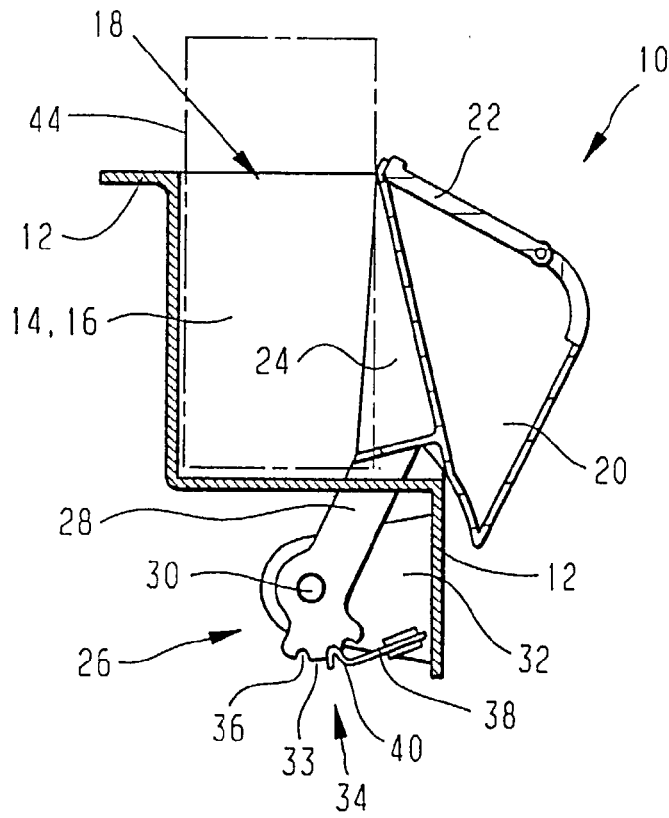

FIGS. 6 and 7 show a modified embodiment of the above-described holding device 10 according to the invention illustrated in FIGS. 1 to 5. Here, the ashtray 20 has no drip tray. The locking device 34 moreover has an additional locking position, illustrated in FIG. 7. To create the additional locking position, an extra recess 36 is located in the end edge 33 of the arm 28 of the ashtray 20. The hook 40 of the leaf spring 38 engages therein when the ashtray 20 is pivoted out of the holding position illustrated in FIG. 6 inwards towards the closed position. In the additional locking position, the ashtray 20 is located in a further holding position; compared with FIG. 6, it is pivoted inwards and reduces the insertion opening of the recess 14 of the dashboard 12 forming the receiving space for the drinks container 44. In this way, a drinks container 44 of smaller diameter can be held safely in the receiving space of the holding device 10 according to the invention. With the exception of the above differences, the holding device 10 illustrated in FIGS. 6 and 7 is of identical construction with and functions in the same manner as the holding device 10 illustrated in FIGS. 1 to 5. To avoid repetition, in respect of FIGS. 6 and 7 the reader is referred to the remarks concerning FIGS. 1 to 5. The same reference numerals have been used for identical components.

The invention claimed is:

1. Holding device for a drinks container, having a receiving space for insertion of the drinks container, characterised in that the receiving space is in the form of a recess (14), in that the recess (14) is open at an upper side and also at one lateral side, and in that the holding device (10) comprises a receptacle (20) that is movably mounted at the recess (14) by a guide (26), wherein the receptacle (20) is arranged to be brought into a closed position, in which it closes the recess (14) at the upper side and at the one lateral side, and into a holding position in which it closes the open lateral side of the recess (14) and opens up an insertion opening (18) for the drinks container (44) at the upper side of the recess (14), and wherein the receptacle (20) is usable in the closed position and in a holding position, wherein the receptacle (20) has one opening which both in the closed position and in the holding position is located on an upper side of the receptacle (20) so that an interior of the receptacle (20) is available through said one opening both in the closed position and in the holding position, wherein the holding device (10) comprises a locking device (34), which locks the receptacle (20) in several holding positions by interlocking engagement, wherein the receptacle (20) in the different holding positions opens up the insertion opening (18) to different sizes for the drinks containers (44).

2. Holding device for a drinks container, having a receiving space for insertion of the drinks container, characterised in that the receiving space is in the form of a recess (14), in that the recess (14) is open at an upper side and also at one lateral side, and in that the holding device (10) comprises a receptacle (20) that is movably mounted at the recess (14) by a guide (26), wherein the receptacle (20) is arranged to be brought into a closed position, in which it closes the recess (14) at the upper side and at the one lateral side, and into a holding position in which it closes the lateral side of the recess (14) and opens up an insertion opening (18) for the drinks container (44) at the upper side of the recess (14), and wherein the receptacle (20) is usable in the closed position and in a holding position, wherein the receptacle (20) has one opening which both in the closed position and in the holding position is located on an upper side of the receptacle (20) so that an interior of the receptacle (20) is available through said one opening both in the closed position and in the holding position.

3. Holding device according to claim 2, characterised in that the guide (26) comprises a pivot bearing for the receptacle (20).

4. Holding device according to claim 2, characterised in that the receptacle (20) comprises a drip tray (42) for the drinks container (44) inserted in the receiving space.

5. Holding device according to claim 2, characterised in that the receptacle (20) is an ashtray.

* * * * *